United States Patent
Yun et al.

(10) Patent No.: US 9,894,074 B2
(45) Date of Patent: Feb. 13, 2018

(54) METHOD AND SYSTEM FOR EXTRACTING ACCESS CONTROL LIST

(71) Applicant: ELECTRONICS AND TELECOMMUNICATIONS RESEARCH INSTITUTE, Daejeon (KR)

(72) Inventors: Jeong-Han Yun, Daejeon (KR); Heemin Kim, Daejeon (KR); Kyoung-Ho Kim, Gokseong-gun (KR); Woonyon Kim, Daejeon (KR); Jungtaek Seo, Daejeon (KR); Eung Ki Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 173 days.

(21) Appl. No.: 14/693,782

(22) Filed: Apr. 22, 2015

(65) Prior Publication Data
US 2016/0006740 A1    Jan. 7, 2016

(30) Foreign Application Priority Data
Jul. 3, 2014 (KR) .......... 10-2014-0082905

(51) Int. Cl.
| G06F 15/173 | (2006.01) |
| H04L 29/06 | (2006.01) |
| H04L 29/12 | (2006.01) |

(52) U.S. Cl.
CPC ........ H04L 63/101 (2013.01); H04L 63/0236 (2013.01); H04L 63/162 (2013.01); H04L 61/6022 (2013.01)

(58) Field of Classification Search
CPC ............ H04L 61/6022; H04L 63/0236; H04L 63/101; H04L 63/162
See application file for complete search history.

(56) References Cited

U.S. PATENT DOCUMENTS

| 8,055,800 B1 * | 11/2011 | Bardzil | H04L 63/0263 709/223 |
| 2002/0016856 A1 * | 2/2002 | Tallegas | H04L 45/00 709/238 |

(Continued)

FOREIGN PATENT DOCUMENTS

| JP | 5083760 B2 | 11/2012 |
| JP | 2014-112448 A | 6/2014 |

(Continued)

OTHER PUBLICATIONS

Rafael Ramos et al., "Flow Whitelisting in SCADA Networks," International Conference of Critical Infrastructure Protection, 2013.
(Continued)

*Primary Examiner* — Mohamed A Wasel
(74) *Attorney, Agent, or Firm* — LRK Patent Law Firm (57) ABSTRACT

A method and system for extracting an access control list having a predetermined format from packets collected for a predetermined period of time, without requiring TCP flag information. By an information collection unit, network packets and network traffic logs are collected. By the information collection unit, a network traffic log including Media Access Control (MAC), Internet Protocol (IP), and port information is extracted from each network packet. By an information analysis unit, an access control list is generated based on the network traffic log.

12 Claims, 6 Drawing Sheets

(56) References Cited

U.S. PATENT DOCUMENTS

| | | | |
|---|---|---|---|
| 2004/0255154 A1* | 12/2004 | Kwan | H04L 63/08 726/4 |
| 2005/0055570 A1* | 3/2005 | Kwan | H04L 63/08 726/4 |
| 2005/0273851 A1* | 12/2005 | Raju Datla | H04L 63/1425 726/14 |
| 2006/0253852 A1 | 11/2006 | Honda et al. | |
| 2008/0104393 A1 | 5/2008 | Glasser et al. | |
| 2009/0232152 A1* | 9/2009 | Chen | H04L 12/42 370/419 |
| 2010/0095367 A1* | 4/2010 | Narayanaswamy | H04L 63/0245 726/12 |
| 2012/0140630 A1* | 6/2012 | McGrath | H04L 47/10 370/235 |
| 2012/0173661 A1* | 7/2012 | Mahaffey | H04L 67/14 709/217 |
| 2013/0070762 A1* | 3/2013 | Adams | H04L 41/0893 370/389 |
| 2013/0074183 A1 | 3/2013 | Yoon | |
| 2014/0198793 A1* | 7/2014 | Allu | H04L 45/245 370/392 |
| 2016/0014146 A1* | 1/2016 | Nakata | H04L 12/6418 726/12 |
| 2017/0163670 A1* | 6/2017 | Manadhata | H04L 63/1425 |

FOREIGN PATENT DOCUMENTS

| | | |
|---|---|---|
| KR | 10-2005-0083956 A | 8/2005 |
| KR | 10-0829507 B1 | 5/2008 |
| KR | 10-2013-0030086 A | 3/2013 |

OTHER PUBLICATIONS

Tomo Kakuta et al., "A detective method of malware infections based on "graylists"," IPSJ SIG Technical Report of Information Processing Society of Japan, vol. 2014-SPT-010, No. 16, Jun. 26, 2014.

Cicso, "Configuring Network Security with ACL," Catalyst 2960 Switch Software Configuration Guide Rel. 12.2(40) SE, URL: http://www.cisco.com/cisco/web/support/JP/docs/SW/L ANSWT-Access/CAT2960SWT/CG/005/swacl.html, Jan. 9, 2012.

\* cited by examiner

METHOD AND SYSTEM FOR EXTRACTING ACCESS CONTROL LIST

CROSS REFERENCE TO RELATED APPLICATION

This application claims the benefit of Korean Patent Application No. 10-2014-0082905, filed Jul. 3, 2014, which is hereby incorporated by reference in its entirety into this application.

BACKGROUND OF THE INVENTION

1. Technical Field

The present invention relates generally to a method and system for extracting an access control list and, more particularly, to a method and system for extracting an access control list between systems from network traffic without requiring flag information.

2. Description of the Related Art

Access control is technology necessary for network resource management, security management, and fault management.

Network Access Control (NAC) that is representative access control technology denotes technology for inspecting the security status of devices that access a network and permitting the access of only secure nodes. However, when a separate agent cannot be installed due to the characteristics of a host, the use of NAC is impossible. Further, there is a problem in that, when an Access Control List (ACL) for network equipment is used, all lists must be manually generated and maintained in real time. Due to this problem, it is realistically very difficult to implement a method of extracting an ACL for all hosts in a given network. Further, access control is generally implemented such that separate equipment monitors network traffic and restricts traffic violating an ACL when necessary. Furthermore, it is difficult to precisely extract the status of connection and a relation between a client and a server, which are most important in the ACL.

In order to solve those problems, technology for automating an ACL is required.

In order to automatically generate an ACL, a conventional scheme is implemented such that flag information in network traffic exchanged between systems is analyzed in the case of a Transmission Control Protocol (TCP), a server-client relation is detected, and a server-side port is assumed to be used as a static port (fixed port), and then an ACL such as "server IP-server port-protocol-client IP" is generated. In other words, a conventional TCP is configured such that when a client sends a synchronization (syn) signal to a server in TCP 3-way handshaking, the server sends syn+acknowledgement (ack) to the client. Then, by utilizing ack sent from the client, flag information is analyzed, and thus a server-client relation is detected. Thereafter, on the assumption that a server port is used as a static port, an ACL such as "server IP-server port-protocol-client IP" is generated. In addition, on the assumption that well-known server ports (e.g., port #80 is a HyperText Transfer Protocol (HTTP) server port) are used as server ports, an ACL is extracted.

Such a conventional scheme is advantageous in that it is most accurate when TCP is used. However, the conventional scheme has the following problems:

1) When packets having specific flags such as syn, finish (fin), and syn+ack required to extract a server-client relation are missing, such a scheme cannot be applied. It is impossible to detect the server-client relation when it is not possible for a traffic analysis tool or security equipment to analyze/log even flag information from all traffic or when a given packet is dropped.

2) Such a scheme cannot be applied to a protocol having no flag information, such as a User Datagram Protocol (UDP).

Meanwhile, as preceding technology related to the present invention, there is a paper entitled "Flow Whitelisting in SCADA Networks (written by Rafael Ramos Regis Barbosa, Ramin Sadre, and Aiko Pras)" published in International Conference of Critical Infrastructure Protection, 2013.

SUMMARY OF THE INVENTION

Accordingly, the present invention has been made keeping in mind the above problems occurring in the prior art, and an object of the present invention is to provide a method and system for extracting an access control list having a predetermined format from packets collected for a predetermined period of time, without requiring TCP flag information.

In accordance with an aspect of the present invention to accomplish the above object, there is provided a method for extracting an access control list, including collecting, by an information collection unit, network packets and network traffic logs; extracting, by the information collection unit, a network traffic log including Media Access Control (MAC), Internet Protocol (IP), and port information from each network packet; and generating, by an information analysis unit, an access control list based on the network traffic log.

The access control list may include one or more of an access control list related to a MAC protocol, an access control list related to an IP, and an access control list related to a port protocol.

When the access control list is the access control list related to the MAC protocol, generating the access control list may include extracting an item corresponding to the MAC protocol from a log set that is a set of the network traffic logs; and including the item in the access control list. In this case, the item may include a source MAC address, a protocol, and a destination MAC, address.

When the access control list is the access control list related to the IP, generating the access control list may include extracting an item corresponding to the IP from a log set that is a set of the network traffic logs; and including the item in the access control list. In this case, the item may include a source MAC address, a source IP address, a protocol, a destination MAC address, and a destination IP address.

When the access control list is the access control list related to the port protocol, generating the access control list may include generating the access control list using a rate of ports used; and supplementing the generated access control list.

Generating the access control list using the rate of ports used may include, if, for each IP2 that communicates with an IP address and port number (IP1, port1), a number of ports used by the IP2 is greater than a preset value, determining that the port1 of the IP1 is a static port and a port of the IP2 is not a static port, thus enabling the access control list to be generated.

In accordance with another aspect of the present invention to accomplish the above object, there is provided a system for extracting an access control list, including an information collection unit for collecting network packets and network traffic logs, and extracting a network traffic log including Media Access Control (MAC), Internet Protocol (IP), and port information from each network packet; and an information analysis unit for generating an access control list based on the network traffic log.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

A basic idea of a method for exacting an Access Control List (ACL), proposed in the present invention, is described as follows:

1) A server port is used as a static port.
2) The server port may communicate with a plurality of client IP addresses and ports.
3) If a port is determined to be a server port, all target ports connected to the server port are client ports.
4) Generally, a client port is not used as a static port, but it is occasionally used as a static port in a special case.
5) In an identical network, a service is occasionally provided using the same server port number by a plurality of IP addresses.
6) When there are various pairs of two-way communication connection between two IP addresses, a service using a dynamic server port may be used.
7) In the case of a User Datagram Protocol (UDP), there is a service in which several IP addresses use the same port as a static port and communicate with each other (mutual ports have the characteristics of a server).
8) In broadcasting, a reception side is a static port.
9) Items that cannot be determined using only the log are asked of a user.

Figure 1:
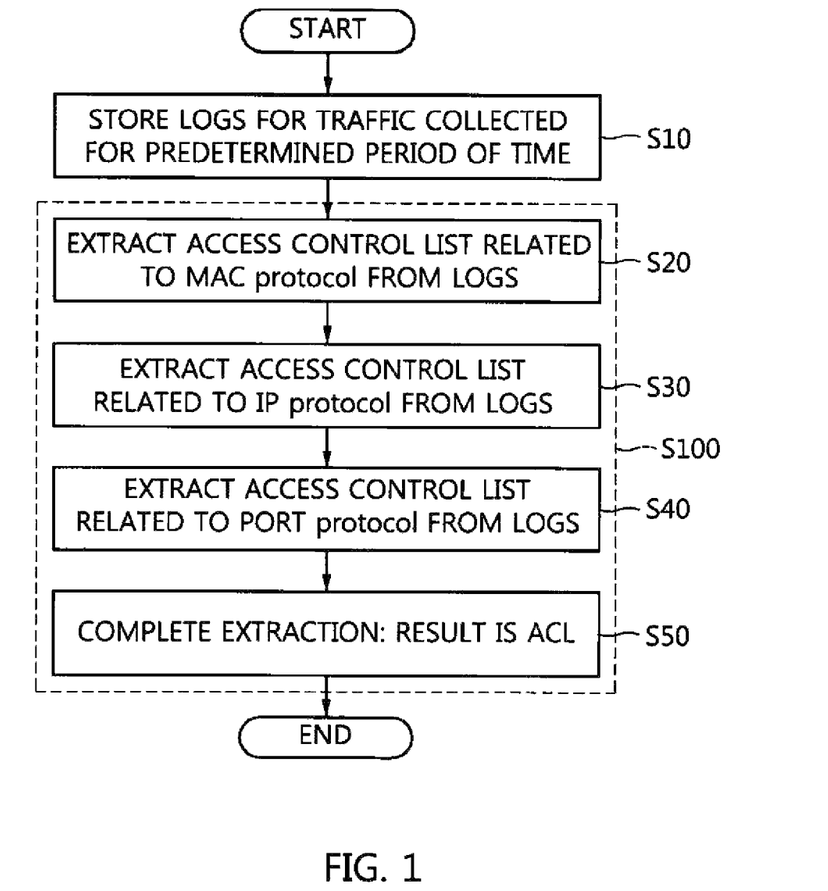
FIG. 1 is a flowchart showing a method for extracting an access control list according to an embodiment of the present invention.

FIG. 1 is a flowchart showing a method for extracting an ACL according to an embodiment of the present invention.

The method of extracting an ACL according to the embodiment of the present invention includes two steps S10 and S100.

First step S10 is the step of logging network packets, and second step S100 is the step of extracting ACLs related to a Media Access Control (MAC) protocol, an Internet Protocol (IP), and a port protocol using packet information stored at first step S10.

First, at first step S10, from all packets or a predetermined number of sampled individual packets that have been collected for a predetermined period of time from a network or a communication node, information (SrcMAC, SrcIP, SrcPort, protocol, DstMAC, DstIP, DstPort) is extracted and stored in a storage medium (not shown). Here, SrcMAC denotes a source MAC address. SrcIP denotes a source IP address. SrcPort denotes a source port. Protocol denotes a protocol that is usable upon transferring a packet from a packet source IP address to a packet destination IP address or from a packet source port to a packet destination port. DstMAC denotes a destination MAC address. DstIP denotes a destination IP address. DstPort denotes a destination port. In this way, information (SrcMAC, SrcIP, SrcPort, protocol, DstMAC, DstIP, DstPort) extracted from all packets or a predetermined number of sampled individual packets collected for the predetermined period of time may be regarded as a network traffic log.

Thereafter, at second step S100, the ACL is extracted using the network traffic log. That is, packets that are targets of the network traffic log are assumed to be normal traffic complying with access control rules, and the ACL is extracted from the packets. An ACL may be represented using only required information of MAC, IP and port information depending on a situation, and each of SrcPort and DstPort may denote one or more port numbers.

In this way, the step of extracting the ACL (that is, second step S100) includes the step S20 of extracting an ACL related to a MAC protocol, the step S30 of extracting an ACL related to an Internet Protocol (IP), and the step S40 of extracting an ACL related to a port protocol. In particular, the step S40 of extracting the ACL related to the port protocol is configured to extract an ACL enabling a port that is temporarily allocated and used and a port that is used as a static port to be distinguished from each other. Steps S20, S30 and S40 will be described in detail below.

Although FIG. 1 shows a scheme in which the step S20 of extracting or generating the ACL related to the MAC protocol, the step S30 of extracting or generating the ACL related to the IP, and the step S40 of extracting or generating the ACL related to the port protocol are sequentially performed, the performance sequence of individual steps may be changed. Unlike this, only one or more of the step S20 of extracting or generating the ACL related to the MAC protocol, the step S30 of extracting or generating the ACL related to the IP, and the step S40 of extracting or generating the ACL related to the port protocol may be performed.

In this way, if the extraction or generation of the ACLs related to the MAC protocol and/or the IP and/or the port protocol has been terminated, a final ACL may be obtained. The step of obtaining the final ACL as a result is represented by step S50 in FIG. 1.

In the above description, second step S100 has been denoted by the ACL extraction step, but it may also be denoted by an ACL generation step.

Figure 2:
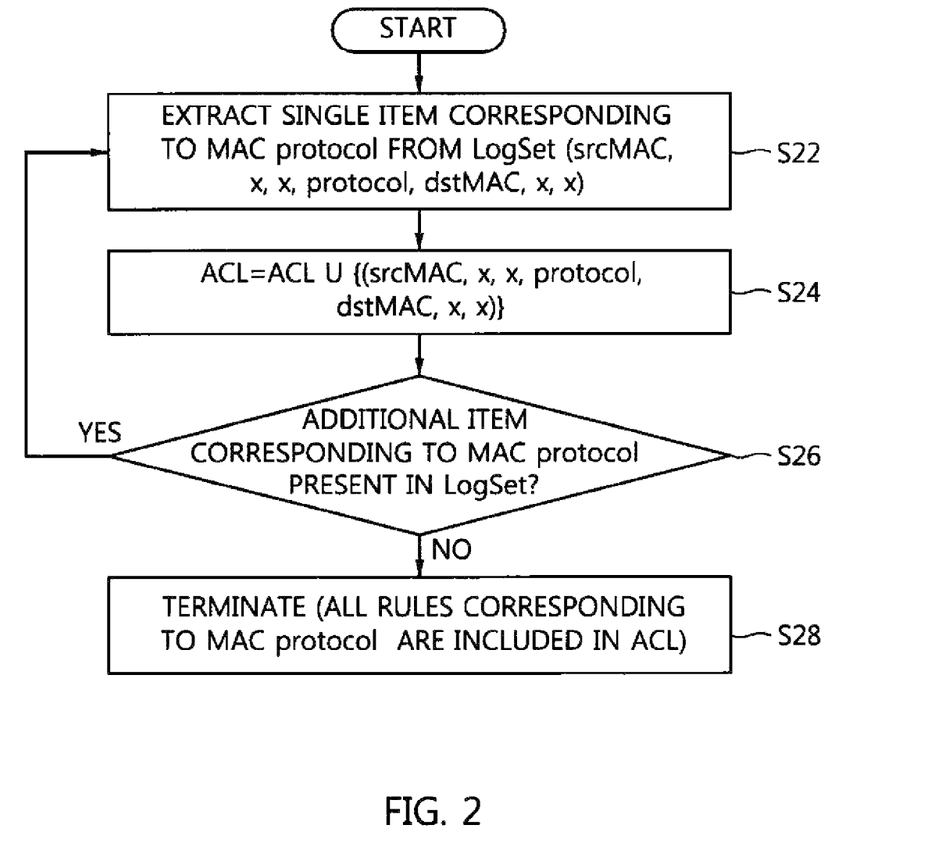
FIG. 2 is a flowchart showing in greater detail the step of extracting an access control list related to a MAC protocol from a network traffic log in FIG. 1.

FIG. 2 is a flowchart showing in greater detail the step S20 of extracting the ACL related to the MAC protocol from the network traffic in FIG. 1.

Referring to FIG. 2, when packets are exchanged via a MAC protocol, that is, a protocol that does not use an IP and a port, if (srcMAC, x, x, protocol, dstMAC, x, x) is included in the network traffic log, the corresponding access control rule is added to the ACL.

That is, a single item corresponding to the MAC protocol (that is, (srcMAC, x, x, protocol, dstMAC, x, x) is extracted from a log set (Logset) that is a set of network traffic logs, stored at first step S10, at step S22.

Next, the extracted item is included in the ACL at step S24.

Then, it is determined whether an additional item corresponding to the MAC protocol (that is, (srcMAC, x, x, protocol, dstMAC, x, x)) is present in the Logset at step S26.

If it is determined that an additional item corresponding to the MAC protocol is present in the Logset, the process returns to step S22 to repeat operations starting from step S22. That is, if there is the additional item corresponding to the MAC protocol, the additional item is added to the ACL.

In contrast, if it is determined that an additional item corresponding to the MAC protocol is not present in the Logset, the process is terminated at step S28. In the case of the MAC protocol, MAC is statically used, and thus access control rules including all packets related to the MAC protocol in the network traffic logs will be present in the ACL completed at step S28.

Figure 3:
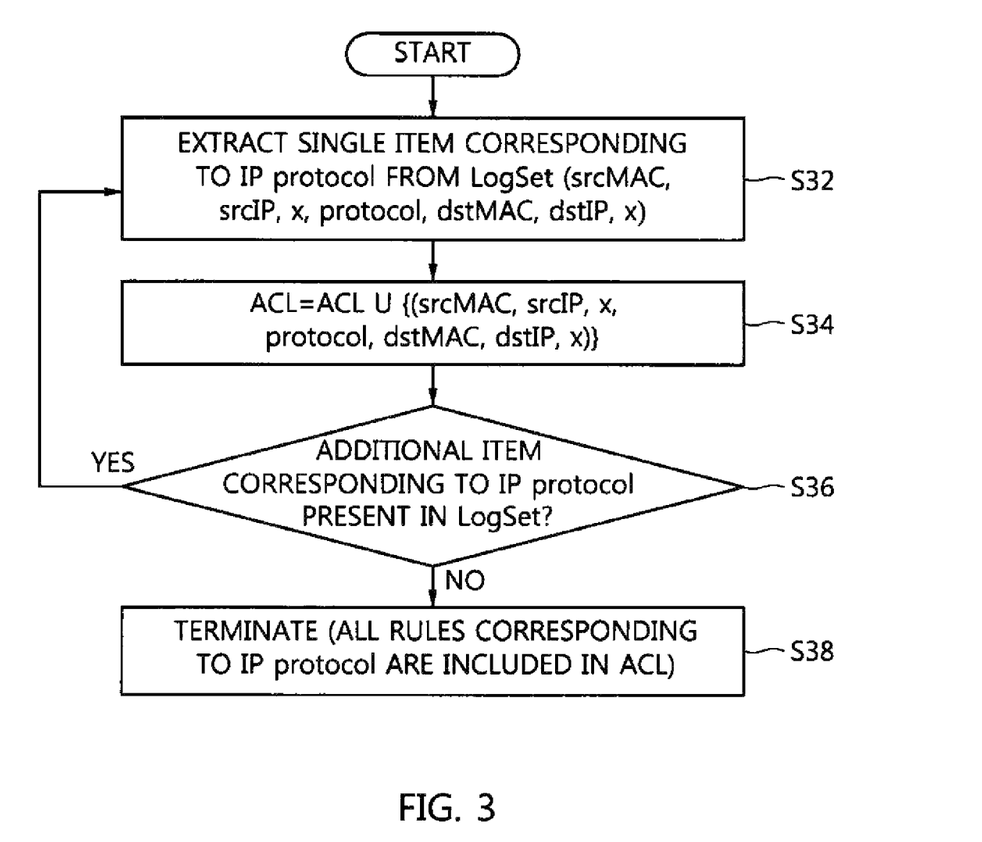
FIG. 3 is a flowchart showing in greater detail the step of extracting an access control list related to an IP from a network traffic log in FIG. 1.

FIG. 3 is a flowchart showing in greater detail the step S30 of extracting the ACL related to the Internet Protocol (IP) from the network traffic log in FIG. 1.

Referring to FIG. 3, when packets are exchanged via the IP, that is, a protocol that does not use a port, if an item (srcMAC, srcIP, x, protocol, dstMAC, dstIP, x) is present in a log, the corresponding access control rule is added to the ACL.

That is, after the step S20 of extracting the ACL related to the MAC protocol from the network traffic log, a single item (that is, (srcMAC, srcIP, x, protocol, dstMAC, dstIP, x)) corresponding to the IP is extracted from the log set (Logset) that is a set of stored network traffic logs at step S32.

Thereafter, the extracted item is included in the ACL at step S34.

Next, it is determined whether an additional item (that is, (srcMAC, srcIP, x, protocol, dstMAC, dstIP, x)) corresponding to the IP is present in the Logset at step S36.

If it is determined that an additional item corresponding to the IP is present in the Logset, the process returns to step S32 to repeat operations starting from step S32. That is, if there is the additional item corresponding to the IP, the additional item is added to the ACL.

In contrast, if it is determined that an additional item corresponding to the IP is not present in the Logset, the process is terminated at step S38. In the case of the Internet Protocol (IP), a MAC address and an IP address are static addresses while a device is statically used, and thus access control rules including all packets related to the IP in the network traffic logs will be present in the ACL completed at step S38.

Figure 4:
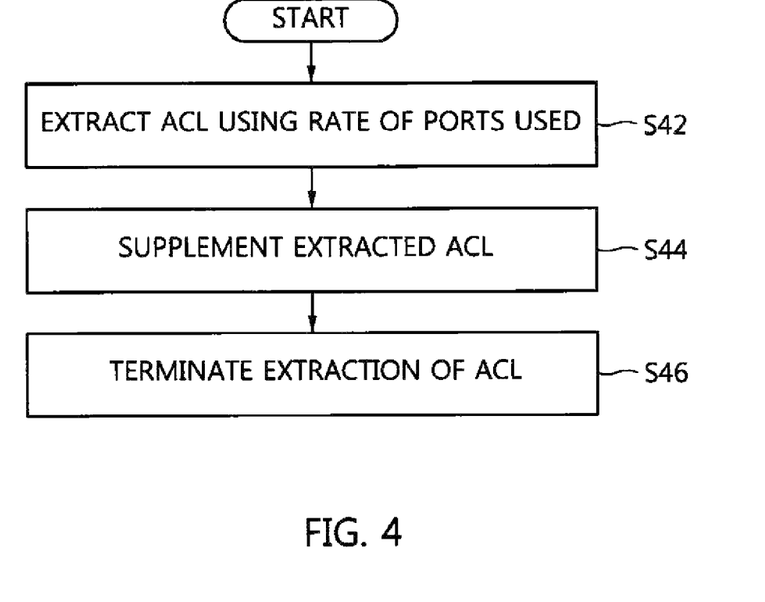
FIG. 4 is a flowchart showing in greater detail the step of extracting an access control list related to a port protocol from a network traffic log in FIG. 1.

FIG. 4 is a flowchart showing in greater detail the step S40 of extracting the ACL related to the port protocol from the network traffic log in FIG. 1. After steps S20 and S30 have been sequentially performed, step S40 is performed.

The term "port protocol" denotes a case where packets are exchanged via a protocol that uses a port (e.g., a Transmission Control Protocol (TCP), a User Datagram Protocol (UDP), etc.).

A basic idea of the step S40 of extracting the ACL related to the port protocol from the network traffic log is that a port to which a larger number of objects are connected is a port to be statically used. For example, for each of MAC, IP, port, and protocol types, the number of object types is extracted. Thereafter, a port having a larger number of connection objects is assumed to be a static port (or a server port), and object ports that communicate with the static port are assumed to be client ports. The overall algorithm is terminated by further extending the ACL extracted in this way via an additional idea.

That is, at step S42, for each object IP2 that communicates with an IP address and port number (IP1, port1), if the number of ports used by the IP2 is greater than a value set by the user, it is determined that the port1 of the IP1 is used as a static port, and the port of the IP2 is not static (not fixed). For traffic for which the IP1 communicates with the IP2 using port1, the port of the IP1 is used as port1 and the port of the IP2 is used as "ANY" in consideration of the transmission direction of packets, thus enabling the ACL to be generated. This utilizes a characteristic that, in a typical server-client model, a server uses a port as a static port and a client uses a random port at each time.

For example, when the network traffic log is analyzed, if the number of ports, used when port #100 of IP address 10.0.0.1 communicates with IP address 10.0.0.2, is greater than a value set by the user (e.g., 50) and two-way communication is performed therebetween, an item (MAC of 10.0.0.1, 10.0.0.1, 100, protocol, MAC of 10.0.0.2, 10.0.0.2, ANY) and an item (MAC of 10.0.0.2, 10.0.0.2, ANY, protocol, MAC of 10.0.0.1, 10.0.0.1, 100) are added to the ACL. In this case, if MAC information is not required in the ACL, it may not be used upon adding the item to the ACL. In the above example, 'ANY' may be regarded as a set including all ports.

Step S42 will be described in detail below. Schemes for representing a method at step S42 include the following two examples.

a) When the IP address 10.0.0.2 with a number of ports equal to or greater than a predetermined number (limit1) performs two-way communication with port #100 of the IP address 10.0.0.1 using a TCP, this communication may be represented by "(10.0.0.1, 100, TCP, ⇆, 10.0.0.2, any)."

b) When IP address 10.0.0.3 with a number of ports equal to or greater than a predetermined number (limit1) transmits packets to port #200 of the IP address 10.0.0.1 using a UDP, this communication may be represented by "(10.0.0.1, 200, UDP, ←, 10.0.0.3, any)."

When communication is performed between two IP addresses using the schemes in a) and b), if the rate of the number of connected ports exceeds a limit number limit1 set by the user, an ACL is configured (generated) in which a counterpart port is used as a static port and in which ports used frequently are determined to be ports randomly used and are then set to 'any.' In this way, at step S42, the ACL is generated using the rate of ports used (the rate of the number of connected ports).

Thereafter, at step S44, an ACL is generated by supplementing cases that are not classified at step S42. At step S44, the ACL may be configured using seven representation methods given in the following Table 1. That is, in order to supplement the ACL, the methods presented in the following Table 1 are repeatedly and gradually applied to step S44. Schemes for applying the methods presented in the following Table 1 may include various examples. One example of the schemes may be configured in a sequence in which methods #1, 2, 4, and 7 in Table 1 are first applied, method #3 is subsequently applied, method #6 is applied to objects remaining after the application of method #3, and then method #5 is applied. In Table 1, limit numbers limit2 and limit3 are thresholds respectively designated by the user.

traffic log or the like even if such methods are configured, there is a need to ask a user about the ACL rules.

An item to be most cautiously checked is a case where a service based on a dynamic server port is used. When services for performing communication while dynamically allocating server ports, as in the case of File Transfer Protocol (FTP) and OLE for Process Control (OPC) services, are used, negotiation is performed over one or more static ports between two IP addresses. Thereafter, a server port is allocated at each negotiation to perform communication, and thus various pairs of communicating ports are present in the network traffic log. If such a case happens, it is checked whether services based on a dynamic server port are used, and then suitable processing such as by opening ports within a specific range in an ACL in conformity with the corresponding security policy or by prohibiting the use of a dynamic server port is required.

If the supplementation of the ACL extracted at step S44 has been completed, the extraction of the ACL is terminated at step S46.

In the above description of the embodiment of the present invention, it is assumed that all of MAC, IP, port, and protocol information is used to create ACL rules. However, if necessary, only required information of MAC, IP, port, and protocol information may be used. That is, it is possible to extract or generate an ACL in consideration of all information or in consideration of only a part of all information.

TABLE 1

<representation method>
'IP1 port1: IP2 port2' means that packets are exchanged therebetween
(first, direction is omitted)
'IP2 port1: IP2 (n)' means that IP2 with n ports exchange packets with
(IP1, port1)

1   When the number of object IP addresses to which (IP1, port1) is connected is
    greater than limit2, (IP1, port1) is static.
    e.g.) 10.5.1.4 8811:10.5.1.2 53359 --> 10.5.1.4 8811:10.5.1.2 any(or 53359)
    10.5.1.4 8811:10.5.1.3 54335 --> 10.5.14 8811:10.5.1.3 any(or 54335)
    10.5.1.4 8811:10.5.1.1 36318 --> 10.5.1.4 8811:10.5.1.1 any(or 36318)
    10.5.1.4 8811:10.5.1.9 40458 --> 10.5.1.4 8811:10.5.1.9 any(or 40458)
2   When port1 of a number of IP addresses greater than limit3 are connected to IP2
    address, port1 is static.
    e.g.) 10.5.1.1 30041:10.5.1.163 (3) --> 10.5.1.1 30041:10.5.1.163 any
    10.5.1.4 30041:10.5.1.163 (2) --> 10.5.1.4 30041:10.5.1.163 any . . .
    103.1.2 30041:10.5.1.163 (2) --> 10.5.1.2 30041:10.5.1.163 any
    10.2.1.1 30041:10.5.1.163 (5) --> 10.2.1.1 30041:10.5.1.163 any
3   Port connected to an already static port is 'any'.
    e.g.) in a state in which 10.1.1.13 135:10.5.1.122 any,
    10.1.1.13 135:10.5.1.121 (2) --> 10.1.1.13 135:10.5.1.121 any
4   In the case of broadcasting, a reception side is static.
    e.g.) 10.5.1.255 7:10.5.1.9 37994 --> 10.5.1.255 7:10.5.1.9 any
5   When a single static port is present between two IP addresses, and a large number
    of non-static ports are present, they are dynamic ports.
    e.g.) 10.5.1.1 21:10.5.1.2 any
    10.5.1.1 35094:10.5.1.2 2673 --> both ports are dynamic
    10.5.1.1 35095:10.5.1.2 2675 --> both ports are dynamic
    10.5.1.1 (2):10.5.1.2 2678 --> both ports are dynamic
    . . .
6   When there are (IP1, port1), (IP2, port2), (IP1, port2), and (IP2, port1), both ports
    are static.
    e.g.) 10.5.1.13 515:10.5.1.164 10009
    10.5.1.13 1009:10.5.1.164 515
    e.g.) 10.5.1.152 9875:10.5.101.161 9875
    e.g.) 10.5.1.152 9876:10.5.101.161 9876
7   A port statically used by another IP address may be static (scheme such as a well-
    known port).
    e.g.) 10.5.1.122 32839:10.5.1.11 (10401) --> 10.5.1.122 32839:10.5.1.11 any
    10.5.1.45 32839:10.5.3.1 46421 --> 10.5.1.45 32839:10.5.3.1 any In a case where ACL rules cannot be exactly designated due to a deficiency in the amount of data in the network Meanwhile, the present invention may be applied to various types of equipment. First, the present invention may be applied to monitoring equipment and inline equipment according to the location of application. Further, the present invention may be applied to equipment for receiving traffic as input and equipment for receiving the traffic log as input according to the characteristic of input information.

Consequently, the equipment to which the present invention is applicable may include equipment for receiving traffic as input while being monitoring equipment, equipment for receiving the traffic log as input while being monitoring equipment, equipment for receiving traffic as input while being inline equipment, and equipment for receiving the traffic log as input while being inline equipment.

Figure 5:
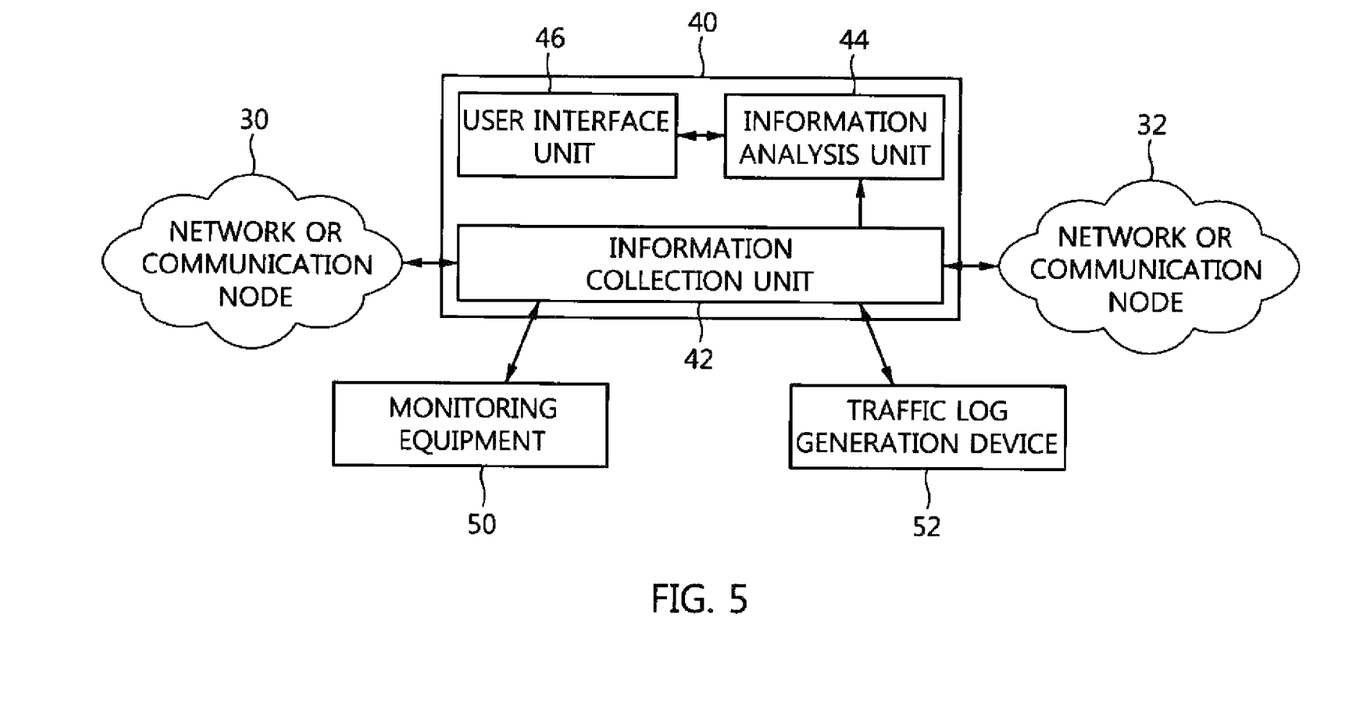
FIG. 5 is a diagram showing an example of a system to which the access control list extraction method according to the embodiment of the present invention is applicable.

FIG. 5 is a diagram showing an example of a system to which the ACL extraction method according to the embodiment of the present invention is applicable. The ACL extraction system of FIG. 5 may be regarded as a typical network switch.

An ACL extraction system 40 of FIG. 5 includes an information collection unit 42, an information analysis unit 44, and a user interface unit 46.

The information collection unit 42 may collect and store network traffic (also referred to as 'network packets') monitored through a network or communication node 30 or 32 and/or the network traffic log received from monitoring equipment 50 or a traffic log generation device 52. Here, monitoring schemes may include switch mirroring, traffic tapping, etc.

Further, the information collection unit 42 may extract information such as (SrcMAC, SrcIP, SrcPort, protocol, DstMAC, DstIP, DstPort) from all packets or a predetermined number of sampled individual packets collected for a predetermined period of time, as in the first step S10 of FIG. 1. Here, the extracted information (SrcMAC, SrcIP, SrcPort, protocol, DstMAC, DstIP, DstPort) may be regarded as the network traffic log.

The information analysis unit 44 may analyze (extract or generate) ACL information using the scheme (see FIG. 1) presented in the present invention, based on the network traffic log extracted by the information collection unit 42.

In other words, as in the second step S100 of FIG. 1, the information analysis unit 44 may extract or generate a final ACL by sequentially performing a procedure for extracting or generating an ACL related to a MAC protocol, a procedure for extracting or generating an ACL related to an IP, and a procedure for extracting or generating an ACL related to a port protocol.

The user interface unit 46 allows a user to adjust settings for the scheme (see FIG. 1) presented in the present invention. Meanwhile, the user interface unit 46 may check the results of analysis (extraction or generation) by the information analysis unit 44. Meanwhile, the user interface unit 46 may adjust the setting of the extraction scheme (see FIG. 1) and then provide a function such as re-performance.

Unlike the above-described FIG. 5, the ACL extraction method according to the embodiment of the present invention may be used in places where whitelist information used by a whitelist-based network switch (see FIG. 6) is generated based on the logs generated by the whitelist-based network switch. In particular, when the present invention is used in connection with the whitelist-based network switch illustrated in FIG. 6, the whitelist-based network switch converts network traffic into a traffic log and is then operated by receiving the corresponding traffic log as input. Therefore, the equipment to which the present invention is applicable may be equipment for receiving the traffic log as input while being monitoring equipment.

Figure 6:
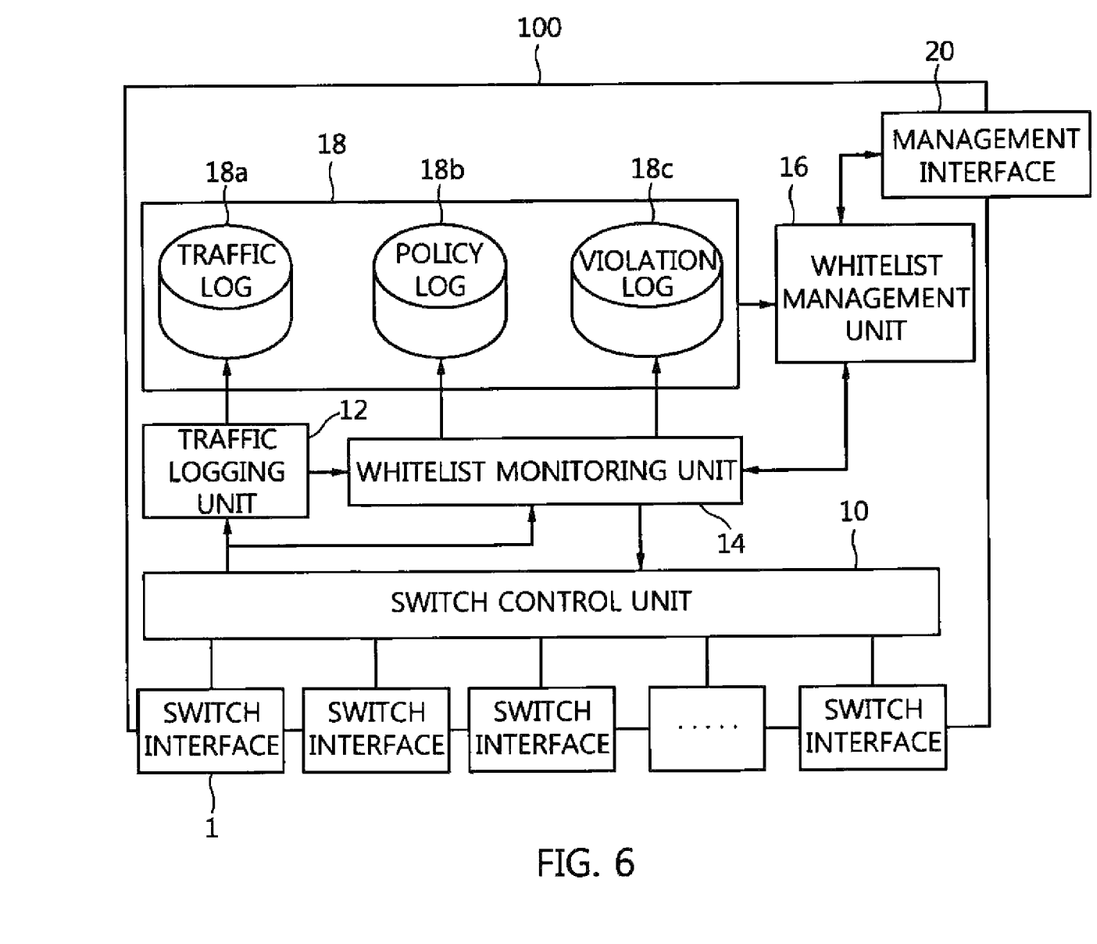
FIG. 6 is a diagram showing another example of a system to which the access control list extraction method according to the embodiment of the present invention is applicable.

FIG. 6 is a diagram showing another example of a system to which the ACL extraction method according to the embodiment of the present invention is applicable.

A whitelist-based network switch 100 of FIG. 6 includes a switch control unit 10, a traffic logging unit 12, a whitelist monitoring unit 14, and a whitelist management unit 16.

The switch control unit 10 may switch packets input through respective switch interfaces 1. The whitelist-based network switch 100 may perform functions such as a network resource management function, an internal network monitoring function, and a control function, via a packet switch function performed by the switch control unit 10. In particular, an individual policy (including determination of whether to permit or block communication) may be applied to each switch interface 1 by the switch control unit 10.

The switch control unit 10 may switch respective packets input through a plurality of switch interfaces 1, transfer the packets to the whitelist monitoring unit 14, and perform a blocking operation in response to a control signal from the whitelist monitoring unit 14.

The traffic logging unit 12 may generate a traffic log 18a. In particular, the traffic logging unit 12 may extract information, for example, a source MAC address, a source IP address, a source port, a destination MAC address, a destination IP address, a destination port, and a protocol, in order to select information corresponding to a whitelist from among the packets switched by and input from the switch control unit 10. Here, it may be considered that the extracted information, such as the source MAC address, source IP address, source port, destination MAC address, destination IP address, destination port, and protocol, corresponds to the network traffic log in the present invention. The information extracted by the traffic logging unit 12 may be transferred to the whitelist monitoring unit 14 and may be used as base data required to determine whether packets violate the whitelist.

The whitelist monitoring unit 14 previously stores a whitelist in which permitted communication nodes and permitted communication rules are defined. The whitelist monitoring unit 14 receives packets incoming from the switch control unit 10, monitors the packets based on the whitelist, and records the number of packets or the amount of traffic occurring per unit time in a policy log 18b, with respect to packets corresponding to the whitelist (that is, packets obeying the whitelist). Further, with respect to packets violating the whitelist, the whitelist monitoring unit 14 records the traffic log 18a and the number of a switch interface, through which the corresponding packets are input, in a violation log 18c. The whitelist monitoring unit 14 may determine whether the corresponding packet violates the preset whitelist, based on the information extracted by the traffic logging unit 12.

Meanwhile, the whitelist monitoring unit 14 may transfer blocking rules for violating traffic (that is, one or more packets, or a set of packets) to the switch control unit 10, thus allowing the switch control unit 10 to block the traffic (this may be regarded as "packet blocking").

The whitelist management unit 16 may take charge of a function of transferring the whitelist to the whitelist monitoring unit 14, and a function of transferring the traffic log 18a, the policy log 18b, and the violation log 18c to an external monitoring system (not shown) through a management interface 20. The external monitoring system uses the received log for the analysis of accidents, the checking of network status, and the generation and change of a whitelist.

In FIG. 6, reference numeral 18, not described, denotes a log unit.

In FIG. 6, although the traffic logging unit 12 capable of extracting information such as a source MAC address, a source IP address, a source port, a destination MAC address, a destination IP address, a destination port, and a protocol, from each packet is present, a component for extracting an ACL is not present. However, those skilled in the art will easily understand that, if the component capable of extracting an ACL, such as the information extraction unit 44 of FIG. 5, is added to the whitelist-based network switch 100 shown in FIG. 6, an ACL may be extracted based on the information extracted by the traffic logging unit 12.

In accordance with the present invention having the above configuration, even if information about a TCP flag cannot be obtained from network traffic, an ACL having a format of (SrcMAC, SrcIP, SrcPort, protocol, DstMAC, DstIP, DstPort) may be automatically extracted.

Meanwhile, the present invention may be applied even to a User Datagram Protocol (UDP).

Server port information detected in an internal network composed of similar systems may be used to predict the server port of another system, like well-known ports.

When a server port is dynamically allocated and used in a server program, information about the presence or non-presence of a dynamic server port may be provided to a user in consideration of dynamic allocation and use of the server port.

When a client port is also used as a static port depending on a communication program, a client port in an ACL must also be statically managed. In accordance with the present invention, when the client port is used as a static port, this may be detected and reported to a user.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A method for extracting an access control list, comprising:
    collecting, by an information collection unit, network packets and network traffic logs;
    extracting, by the information collection unit, a network traffic log including Media Access Control (MAC), Internet Protocol (IP), and port information from each network packet; and
    generating, by an information analysis unit, an access control list based on the network traffic log,
    wherein the access control list includes one or more of an access control list related to a MAC protocol, an access control list related to an IP, and an access control list related to a port protocol, and
    wherein when the access control list is the access control list related to the port protocol, generating the access control list comprises:
    generating the access control list using a rate of ports used; and
    supplementing the generated access control list by determining that port1 of an IP address 1 (IP1) is a static port and/or a port of each IP address 2 (IP2) is a static port and modifying the access control list based on determining that port1 of the IP1 is a static port and/or a port of each IP2 is a static port.

2. The method of claim 1, wherein when the access control list is the access control list related to the MAC protocol, generating the access control list comprises:
    extracting an item corresponding to the MAC protocol from a log set that is a set of the network traffic logs; and
    including the item in the access control list.

3. The method of claim 2, wherein the item includes a source MAC address, a protocol, and a destination MAC address.

4. The method of claim 1, wherein when the access control list is the access control list related to the IP, generating the access control list comprises:
    extracting an item corresponding to the IP from a log set that is a set of the network traffic logs; and
    including the item in the access control list.

5. The method of claim 4, wherein the item includes a source MAC address, a source IP address, a protocol, a destination MAC address, and a destination IP address.

6. The method of claim 1, wherein generating the access control list using the rate of ports used comprises, if, for each IP2 that communicates with an IP address and port number (IP1, port1), a number of ports used by the IP2 is greater than a preset value, determining that the port1 of the IP1 is a static port and a port of the IP2 is not a static port, thus enabling the access control list to be generated.

7. A system for extracting an access control list, comprising:
    an information collection unit for collecting network packets and network traffic logs, and extracting a network traffic log including Media Access Control (MAC), Internet Protocol (IP), and port information from each network packet; and
    an information analysis unit for generating an access control list based on the network traffic log,
    wherein the access control list includes one or more of an access control list related to a MAC protocol, an access control list related to an IP, and an access control list related to a port protocol, and
    wherein when the access control list is the access control list related to the port protocol, the information analysis unit generates the access control list using a rate of ports used, and supplements the generated access control list by determining that port1 of an IP address 1 (IP1) is a static port and/or a port of each IP address 2 (IP2) is a static port and modifying the access control list based on determining that a port1 of IP1 is a static port and/or a port of each IP2 is a static port.

8. The system of claim 7, wherein when the access control list is the access control list related to the MAC protocol, the information analysis unit is configured to extract an item corresponding to the MAC protocol from a log set that is a set of the network traffic logs and include the item in the access control list.

9. The system of claim 8, wherein the item includes a source MAC address, a protocol, and a destination MAC address.

10. The system of claim 7, wherein when the access control list is the access control list related to the IP, the information analysis unit extracts an item corresponding, to the IP from a log set that is a set of the network traffic logs, and includes the item in the access control list.

11. The system of claim 10, wherein the item includes a source MAC address, a source IP address, a protocol, a destination MAC address, and a destination IP address.

12. The system of claim 7, wherein the information analysis unit is configured such that, upon generating the access control list using the rate of ports used, if, for each IP2 that communicates with an IP address and port number (IP1, port1), a number of ports used by the IP2 is greater than a preset value, it is determined that the port1 of the IP1 is a static port and a port of the IP2 is not a static port, thus enabling the access control list to be generated.

* * * * *